(12) United States Patent  
Kim

(10) Patent No.: US 12,259,018 B2
(45) Date of Patent: Mar. 25, 2025

(54) TORSIONAL DAMPER AND HYBRID DRIVE MODULE COMPRISING SAME

(71) Applicant: VALEO KAPEC CO., LTD., Daegu (KR)

(72) Inventor: Jung-Woo Kim, Daegu (KR)

(73) Assignee: VALEO KAPEC CO., LTD., Daegu (KR)

( * ) Notice: Subject to any disclaimer, the term of this patent is extended or adjusted under 35 U.S.C. 154(b) by 0 days.

(21) Appl. No.: 18/712,944

(22) PCT Filed: Nov. 2, 2022

(86) PCT No.: PCT/KR2022/016961
§ 371 (c)(1),
(2) Date: May 23, 2024

(87) PCT Pub. No.: WO2023/096198
PCT Pub. Date: Jun. 1, 2023

(65) Prior Publication Data
US 2025/0020187 A1     Jan. 16, 2025

(30) Foreign Application Priority Data
Nov. 25, 2021   (KR) .................. 10-2021-0164739

(51) Int. Cl.
*F16F 15/121* (2006.01)
(52) U.S. Cl.
CPC ................. *F16F 15/1216* (2013.01)
(58) Field of Classification Search
CPC ................................ F16F 15/1216
See application file for complete search history.

(56) References Cited

U.S. PATENT DOCUMENTS

| 4,700,821 | A |   | 10/1987 | Maucher et al. |
| 5,383,540 | A | * | 1/1995  | MacDonald ............ F16H 45/02 192/3.3 |

(Continued)

FOREIGN PATENT DOCUMENTS

| JP | 02-105613 U | 8/1990 |
| JP | 11-030245 A | 2/1999 |

(Continued)

OTHER PUBLICATIONS

International Search Report issued Feb. 22, 2023, in PCT/KR2022/016961, filed on Nov. 2, 2022, 4 pages.

*Primary Examiner* — Kevin A Lathers
(74) *Attorney, Agent, or Firm* — Oblon, McClelland, Maier & Neustadt, L.L.P.

(57) ABSTRACT

A torsional damper disposed between a rotor sleeve, which is configured to receive a rotational force of an engine, and a rotor hub, which is disposed rearward of the rotor sleeve, and configured to transmit the rotational force of the engine to the rotor hub, and a hybrid drive module to which the torsional damper is applied, includes: a first damper, and the first damper includes a first cover plate provided at a driving side and having a first stopper, a first stopper accommodation portion provided at a driven side and configured to accommodate the first stopper, and shield members configured to cover an opening of the first stopper accommodation portion to restrict a movement of a fluid in a radial direction through the first stopper accommodation portion.

20 Claims, 9 Drawing Sheets

(56) References Cited

U.S. PATENT DOCUMENTS

| | | | |
|---|---|---|---|
| 5,622,244 A * | 4/1997 | Hansen | F16D 47/06 192/208 |
| 5,964,329 A * | 10/1999 | Kawaguchi | F16H 45/02 192/3.3 |
| 7,287,630 B2 * | 10/2007 | Takahashi | F16H 45/02 192/3.29 |
| 8,202,169 B2 | 6/2012 | Jameson | |
| 10,323,698 B2 * | 6/2019 | Wilton | F16H 45/02 |
| 11,493,123 B2 | 11/2022 | Kim et al. | |
| 2005/0204537 A1 | 9/2005 | Reed et al. | |
| 2005/0204861 A1 | 9/2005 | Reed et al. | |
| 2005/0204862 A1 | 9/2005 | Reed et al. | |
| 2005/0205335 A1 | 9/2005 | Reed et al. | |
| 2005/0205373 A1 | 9/2005 | Foster et al. | |
| 2005/0205379 A1 | 9/2005 | Tryon et al. | |
| 2005/0205380 A1 | 9/2005 | Raszkowski | |
| 2005/0205381 A1 | 9/2005 | Tryon et al. | |
| 2005/0205382 A1 | 9/2005 | Tryon et al. | |
| 2005/0205383 A1 | 9/2005 | Reed et al. | |
| 2005/0205384 A1 | 9/2005 | Reed et al. | |
| 2005/0205385 A1 | 9/2005 | Reed et al. | |
| 2005/0205386 A1 | 9/2005 | Reed et al. | |
| 2005/0206134 A1 | 9/2005 | Raszkowski et al. | |
| 2005/0206248 A1 | 9/2005 | Raszkowski et al. | |
| 2005/0206251 A1 | 9/2005 | Foster | |
| 2005/0206253 A1 | 9/2005 | Hertz et al. | |
| 2005/0206256 A1 | 9/2005 | Reed et al. | |
| 2005/0206259 A1 | 9/2005 | Raszkowski | |
| 2005/0206349 A1 | 9/2005 | Raszkowski et al. | |
| 2005/0207835 A1 | 9/2005 | Schoch et al. | |
| 2005/0208782 A1 | 9/2005 | Reed et al. | |
| 2005/0209037 A1 | 9/2005 | Kempf | |
| 2005/0209038 A1 | 9/2005 | Kempf et al. | |
| 2005/0209039 A1 | 9/2005 | Kempf | |
| 2005/0209040 A1 | 9/2005 | Foster et al. | |
| 2010/0135714 A1 | 6/2010 | Jameson | |
| 2021/0356032 A1 | 11/2021 | Kim et al. | |

FOREIGN PATENT DOCUMENTS

| | | |
|---|---|---|
| JP | 2004-125074 A | 4/2004 |
| KR | 10-2005-0054915 A | 6/2005 |
| KR | 10-2238845 B1 | 4/2021 |
| KR | 10-2021-0141874 A | 11/2021 |

\* cited by examiner

TORSIONAL DAMPER AND HYBRID DRIVE MODULE COMPRISING SAME

TECHNICAL FIELD

This application claims priority to and the benefit of Korean Patent Application No. 10-2021-0164739 filed in the Korean Intellectual Property Office on Nov. 25, 2021, the entire contents of which are incorporated herein by reference.

The present invention relates to a torsional damper and a hybrid drive module, and more particularly, to a wet torsional damper having a compact structure and configured to allow oil to be supplied smoothly, and a hybrid drive module including the same.

BACKGROUND ART

A drive module used for a hybrid vehicle has a structure configured to transmit a force of a motor and a force of an engine to a transmission. A hybrid drive module includes an input member configured to receive the force of the engine, a motor, an engine clutch configured to connect the input member and the motor, an output member configured to receive the force of the motor and/or the engine and transmit the force to the transmission, and a power transmission part configured to connect the motor and the output member. The power transmission part may have a structure configured to connect the motor directly to the output member or including a torque converter and a lock-up clutch.

Typically, an engine clutch is provided between the input member and the motor, and a torsional damper (hereinafter, also simply referred to as a 'damper') is provided between the engine clutch and the input member to absorb vibration of an output from the engine.

KR10-2238845B1 discloses a damper structure in which two dampers are connected in series, which is advantageous in designing low rigidity. Further, the two dampers are disposed between a first motor and a second motor based on an axial direction and disposed inside the first motor and the second motor based on a radial direction, which is advantageous in designing the compact hybrid drive module. The disclosed damper applied to the hybrid drive module is usually a wet damper that needs to be lubricated and cooled by oil in an automatic transmission. For this reason, in case that the damper is designed compactly as described above, there occurs a problem in that oil cannot smoothly circulate to the corresponding damper.

DISCLOSURE

Technical Problem

The present invention has been made in an effort to solve the above-mentioned problem, and an object of the present invention is to provide a torsional damper, which is a wet torsional damper having a compact shape and capable of being supplied with oil smoothly, and a hybrid drive module to which the torsional damper is applied.

The present invention has also been made in an effort to provide a hybrid drive module with a compact structure in which torsional dampers are connected in series, which makes it easy to configure a low-rigidity damper.

The present invention has also been made in an effort to provide a hybrid drive module in which a maximum diameter of a torsional damper is ensured even in a space insufficient to ensure the diameter of the torsional damper.

The objects of the present invention are not limited to the above-mentioned objects, and other objects and advantages of the present invention, which are not mentioned above, may be understood from the following descriptions and more clearly understood from the embodiment of the present invention. In addition, it can be easily understood that the objects and advantages of the present invention may be realized by means defined in the claims and a combination thereof.

Technical Solution

In order to achieve the above-mentioned objects, the present invention may be applied to a hybrid drive module including a rotor sleeve connected to an engine and configured to rotate by receiving power of the engine, a rotor hub connected to the rotor sleeve through an engine clutch, and a drive motor installed on the rotor hub.

An auxiliary motor may be installed on the rotor sleeve. The auxiliary motor may serve to start the engine or convert driving power of the engine into electrical energy. The auxiliary motor (first motor) may include a first rotor disposed radially outside the rotor sleeve.

The drive motor may provide driving power for operating a vehicle equipped with the hybrid drive module. The drive motor (second motor) may include a second rotor disposed radially outside the rotor hub.

The first motor may be disposed forward of the second motor.

The rotor sleeve may include a radial extension portion extending in a radial direction, and an axial extension portion extending in an axial direction from an end of the radial extension portion.

The first rotor may be installed on an outer periphery of the axial extension portion.

The rotor sleeve and the rotor hub may be connected to or disconnected from each other by means of an engine clutch. When the rotor sleeve is connected to the rotor hub by the operation of the engine clutch, driving power of the engine may be transmitted to the rotor hub, and both the driving power of the engine and the driving power of the drive motor may be transmitted, as outputs, to a transmission.

The engine clutch may be locked up or unlocked by being pressed or released by a piston plate disposed rearward of the engine clutch. That is, the engine clutch may be locked up when the piston plate moves forward and presses friction plates of the engine clutch forward, and the engine clutch may be unlocked when the piston plate moves rearward and releases the friction plates.

The torsional damper may be installed between the rotor sleeve and the engine clutch. That is, the torsional damper may be disposed between the rotor sleeve and the rotor hub and transmit the rotational force of the engine to the rotor hub.

The torsional damper may include a first damper. The first damper may be a wet damper configured to be lubricated and/or cooled by oil.

The first damper may be disposed radially inside the first rotor.

The first damper may be disposed rearward of the radial extension portion of the rotor sleeve and disposed radially inside the axial extension portion.

The first damper may be disposed forward of the engine clutch.

The first damper may include a first cover plate connected to the rotor sleeve, a driven plate connected to the rotor hub, and a first damper spring configured to transmit a rotational force of the first cover plate to the driven plate.

The first cover plate may be disposed between the rotor sleeve and the first damper spring in a power system.

The first damper spring may absorb vibration of a rotational force of the engine.

The driven plate may be connected to the rotor hub between the first damper spring and the rotor hub without a second damper, which will be described below, or connected to the rotor hub through the second damper to be described below.

The first damper spring may have a coil spring shape extending in an arc or straight shape. The plurality of first damper springs may be installed on the first cover plate and disposed at predetermined intervals in a circumferential direction. The first damper spring may be supported by the first cover plate in the axial direction, the circumferential direction, and the radial direction.

The driven plate may have a plurality of first neck portions disposed in spaces between the plurality of first damper springs disposed to be spaced apart from one another in the circumferential direction.

The first damper spring may transmit the rotational force of the first cover plate to the driven plate by being pressed in a compression direction by the driven plate.

Specifically, the rotational force of the engine may be transmitted to the first cover plate, and the first damper spring supported by the first cover plate may press the first neck portion in the rotation direction, such that the driven plate may rotate. In this case, the first damper spring may absorb a non-uniform output of the engine and uniformly transmit the output to the driven plate.

The first cover plate of the first damper may be disposed radially outward of the first damper spring and connected to the axial extension portion of the rotor sleeve.

A rear side of the first damper spring of the first damper may be supported by the first cover plate, and a front side of the first damper spring of the first damper may be supported by the rotor sleeve. Specifically, the first damper spring may be supported in the axial direction by the radial extension portion of the rotor sleeve, supported in the radial direction by the axial extension portion of the rotor sleeve, and supported in the circumferential direction by a first circumferential support portion provided on the rotor sleeve.

In case that the torsional damper includes only the first damper without the second damper to be described below, the first damper and the engine clutch may be spline-connected so that a rotation of the first damper and a rotation of the engine clutch are restricted in a rotation direction, and the first damper and the engine clutch are allowed to relatively slide in the axial direction. That is, an inner peripheral surface of a radial inner end of the driven plate and the engine clutch may be spline-connected.

A first hysteresis device may be provided on the first damper and provide first hysteresis torque to the first damper.

The first hysteresis device may include a first front friction washer disposed between the rotor sleeve and the driven plate in the axial direction, a first rear friction washer disposed between the driven plate and the first cover plate in the axial direction, and a first elastomer disposed between the driven plate and the first rear friction washer in the axial direction.

The first elastomer may be a first elastic washer.

The first elastic washer may be disposed between the driven plate and the first rear friction washer in a state in which a preload is applied. The first hysteresis torque may be intuitively determined by a preload of the first elastic washer. Further, even though the engine clutch operates and the driven plate connected to the engine clutch receives a forward axial force, the first elastic washer and the second elastic washer may consistently apply a designed preload to the driven plate and the driven hub without being affected by the axial force.

The torsional damper may further include the second damper connected to the first damper. In this case, unlike the case in which the torsional damper includes only the first damper as described above, the second damper may be spline-connected to the engine clutch.

The second damper may be disposed axially rearward of the first motor and connected in series to the first damper. The second damper may also be a wet damper configured to be cooled by oil.

The second damper may be disposed radially inside the second rotor.

The second damper may be disposed forward of the engine clutch.

The second damper may include a second cover plate connected to the first damper and configured to receive the rotational force of the first damper, a driven hub connected to the engine clutch, and a second damper spring configured to transmit the rotational force of the second cover plate to the driven hub.

The second cover plate may be connected to the driven plate of the first damper and receive the rotational force of the first damper.

A first binding portion may be provided radially inside the driven plate, and a second binding portion bound to the first binding portion may be provided radially inside the second cover plate. The first binding portion and the second binding portion are bound, such that the second cover plate may be connected to the driven plate.

The second damper spring may have a coil spring shape extending in an arc or straight shape. The plurality of second damper springs may be installed on the second cover plate and disposed at predetermined intervals in the circumferential direction. The second damper spring may be supported by the second cover plate in the axial direction, the circumferential direction, and the radial direction.

The driven hub may have a plurality of second neck portions disposed in spaces between the plurality of second damper springs disposed to be spaced apart from one another in the circumferential direction.

The second damper spring may transmit the rotational force of the second cover plate to the driven hub by being pressed in a compression direction by the driven hub.

Specifically, the rotational force, which is uniformized to some extent by the first damper spring and transmitted to the driven plate, is transmitted to the second cover plate, and the second damper spring, which is supported by the second cover plate, presses the second neck portion in the rotation direction, such that the driven hub may be rotated. In this case, the second damper spring may also absorb a non-uniform output and more uniformly transmit the output to the driven hub.

According to the torsional damper, a damping force of the second damper may be designed to be higher than that of the first damper. Then, the entire low non-uniformity of the output may be covered by the first damper, and the non-uniform output, which exceeds a level of covered by the first damper, may be covered by the second damper.

Like the first damper, a second hysteresis device may also be provided on the second damper and provide second hysteresis torque to the second damper. In this case, the second hysteresis device is also disposed similar to the first hysteresis device, such that elastic forces of the elastic washers of the two hysteresis devices do not affect each other. Even though the engine clutch operates and the driven hub connected to the engine clutch receives a forward axial force, the elastic washers of the two hysteresis devices may consistently apply a designed preload to the driven plate and the driven hub without being affected by the axial force.

According to the present invention, the hysteresis torque is provided to both the two dampers connected in series, which may further improve the effect of reducing noise when the engine idles.

The driven plate of the first damper may include a driven body portion extending in the radial direction, and a first neck portion connected to a radially outer side of the driven body portion and configured to interfere with the first damper spring in the circumferential direction.

The driven body portion has an inclined section extending radially outward in a shape inclined with respect to the axial direction. Further, a first stopper accommodation portion is provided on the inclined section.

The first cover plate of the first damper may include a first cover body portion disposed radially inward of the first damper spring.

The first cover body portion is disposed radially outward of the inclined section. Further, a first stopper is provided radially inside the first cover body portion. The first stopper extends radially inward from the first cover body portion and is accommodated in the first stopper accommodation portion.

A circumferential width of the first stopper accommodation portion is larger than a circumferential width of the first stopper, such that a rotational displacement of the first cover plate relative to the driven plate may be restricted to a predetermined range.

The first damper further includes a shield member configured to cover an opening of the first stopper accommodation portion to restrict a movement of a fluid in the radial direction through the first stopper accommodation portion.

The first stopper accommodation portion may include a first opening directed in a direction in which the first stopper is accommodated, and a second opening opposite to the first opening.

In the first embodiment, the shield member may cover the first opening.

In the first embodiment, the shield member may be provided on the first cover plate. Therefore, the shield member and the first cover plate may integrally move.

The shield member may be an oil dam. The oil dam may extend radially inward from the first cover body portion in a shape corresponding to a shape in which the inclined section of the driven body portion is inclined with respect to the axial direction.

The oil dam may cover the first stopper accommodation portion at a radially outer side of the first stopper accommodation portion without being accommodated in the first stopper accommodation portion.

The oil dam and the first stopper may be alternately disposed in the circumferential direction.

A width of the oil dam may be much larger than a width of the first stopper in the circumferential direction.

In the second embodiment, the shield member may cover the second opening.

In the second embodiment, the shield member may be provided on the driven plate. Therefore, the shield member and the driven plate may integrally move.

The shield member may be a baffle plate.

The baffle plate may be stacked on the radial inner surface of the inclined section of the driven body portion and cover the first stopper accommodation portion at the radially inner side of the first stopper accommodation portion.

The baffle plate may include a baffle body portion corresponding to the inclined section and configured to cover the first stopper accommodation portion, and a third binding portion extending toward a radially inner side of the baffle body portion and fixed to the driven plate.

The first binding portion of the driven plate and the second and third binding portions of the second cover plate may be fixed together by common fixing means. Therefore, the baffle plate may also be coupled during a process of coupling the driven plate and the second cover plate, which needs to be performed anyway, without adding a process of separately fixing the baffle plate.

Because the baffle plate only needs to block a flow of the fluid, the baffle plate is manufactured to be much thinner than the driven plate, which may reduce the weight.

A first fluid passageway may be formed on the driven plate and connect a front space and a rear space of the driven plate so that the front space and the rear space of the driven plate communicate with each other.

A second fluid passageway connected to the first fluid passageway may be formed on the second cover plate.

A third fluid passageway connected to the first fluid passageway may be formed on the shield member.

The present invention provides not only the torsional damper but also the hybrid drive module to which the torsional damper is applied.

The torsional damper is a wet damper configured to be cooled by oil.

A space between the rotor sleeve and the rotor hub is filled with oil, and the oil supplied to the space flows from the inside to the outside in the radial direction.

Advantageous Effects

According to the torsional damper and the hybrid drive module having the same according to the present invention, the first damper is disposed radially inside the first rotor, and the second damper is additionally disposed radially inside the second rotor in addition to the first damper, such that the hybrid drive module may be significantly compact in the axial direction, and oil for cooling and lubrication may be induced to be sufficiently supplied to the necessary elements of the torsional damper with the reduced radius.

The shield member, which guides the supply of oil as described above, is integrated with the first cover plate of the first damper, or the additional baffle plate is connected simply during a process of connecting the first damper and the second damper. Therefore, the oil for cooling and lubrication may be induced to be sufficiently supplied to the necessary elements of the torsional damper without a complicated process or structure.

According to the present invention, the baffle plate is installed forward of the first damper instead of being installed between the first damper and the second damper, such that the first damper and the second damper may be designed to be disposed more adjacent to each other, which may smoothly supply the oil to the necessary elements of the wet damper while further reducing an axial dimension of the torsional damper.

According to the present invention, the torsional damper is configured by connecting the first damper and the second damper in series, which may be designed with low rigidity.

According to the present invention, the first cover plate of the first damper is disposed radially outward of the first damper spring and connected to the axial extension portion of the rotor sleeve, such that the first damper spring may be disposed as far from the rotation center in the radial direction as possible. Therefore, even under a design condition in which a maximum radius cannot be ensured because of the disposition radially inside the first rotor, a circumferential width of the first neck portion may be maximally ensured, which may further reduce the thickness of the driven plate. This may achieve an effect of reducing production costs, weight, and the like.

According to the present invention, the rotor sleeve also serves as the cover plate of the first damper, such that the hybrid drive module may be more compactly designed in the axial direction.

According to the present invention, the free angle that the torsional damper needs to have is distributed to the first damper and the second damper, which may ensure maximum circumferential widths of the first and second neck portions of the first and second dampers having small diameters. Therefore, even under a design condition in which a maximum radius cannot be ensured because of the disposition radially inside the first and second rotors, circumferential widths of the first and second neck portions may be maximally ensured, which may further reduce the thicknesses of the driven plate and the driven hub. This may achieve an effect of reducing production costs, weight, and the like.

According to the present invention, the hysteresis torque is applied to both the first and second dampers connected in series, which may improve the effect of reducing noise. In addition, when the second hysteresis torque, which is applied to the second damper disposed to be farther from the engine, is set to be equal to or higher than the first hysteresis torque applied to the first damper disposed to be closer to the engine, the hysteresis torque, which corresponds to an amplitude of an idling output of the engine, is applied to both the two dampers connected in series in accordance with the designed intention, such that the effect of reducing noise may be more assuredly exhibited.

In addition, according to the present invention, the elastic body, which provides hysteresis torque to one or more dampers constituting the torsional damper, applies a corresponding elastic force to the damper in accordance with a designed preload regardless of whether the engine clutch operates, such that the intended hysteresis torque may be provided.

The specific effects of the present invention, together with the above-mentioned effects, will be described along with the description of specific items for carrying out the present invention.

EXPLANATION OF REFERENCE NUMERALS AND SYMBOLS

Figure 1:
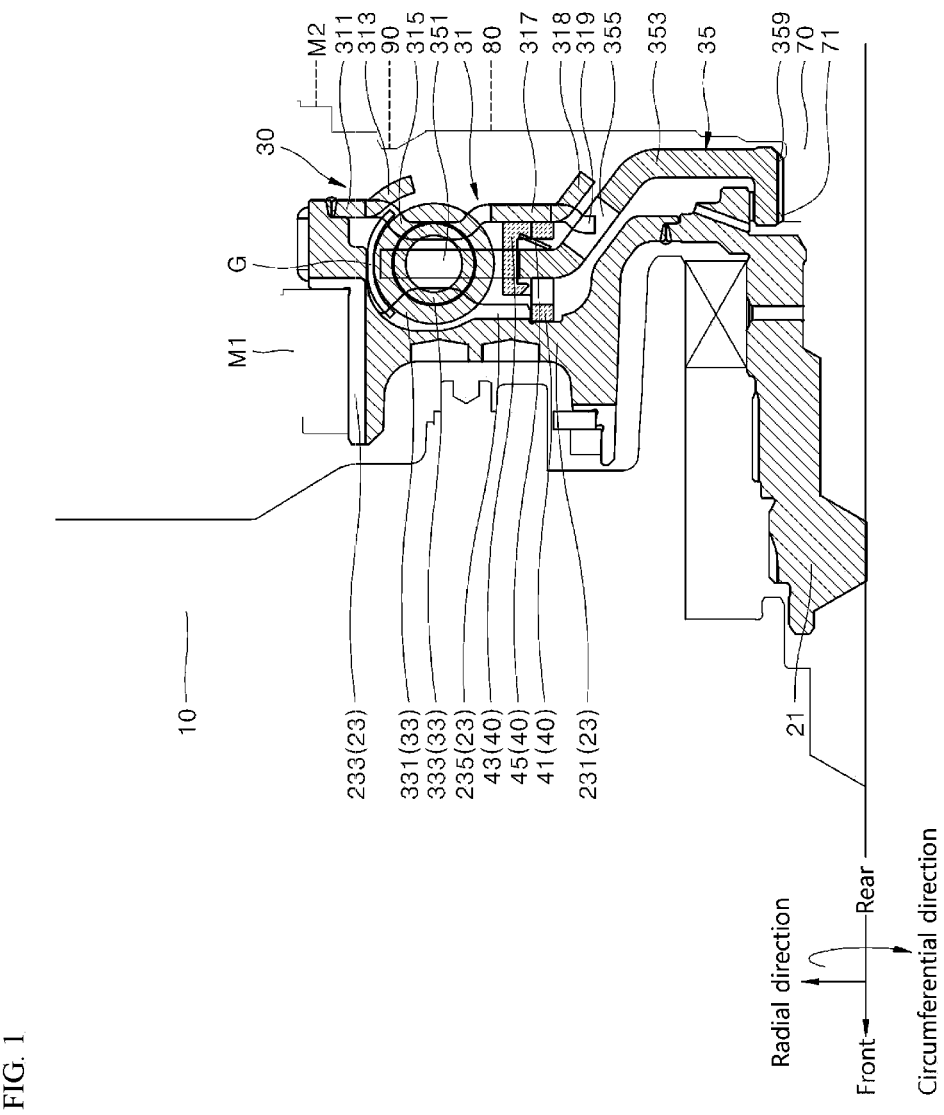
FIG. 1 is an enlarged cross-sectional side view illustrating a hybrid drive module to which a torsional damper of a first embodiment according to the present invention is applied.

10: Cover
M1: First rotor (first motor, auxiliary motor)
21: Rotor shaft
23: Rotor sleeve
231: Radial extension portion
233: Axial extension portion
235: First circumferential support portion
G: Spring guide
30: First damper (first torsional damper)
31: First cover plate
311: Centrifugal side fixing portion
313: First spring cover portion
315: Second circumferential support portion
317: First cover body portion
318: Oil dam (shield member)
319: First stopper
33: First damper spring
331: First damper large-diameter spring
333: First damper small-diameter spring
35: Driven plate
351: First neck portion
353: Driven body portion
355: First stopper accommodation portion
357: First binding portion
358: First fluid passageway
359: First damper side spline
37: Baffle plate
371: Baffle body portion
373: Third binding portion (shield member)
375: Third fluid passageway
40: First hysteresis device
41: First front friction washer
43: First rear friction washer
45: First elastic washer
50: Second damper (second torsional damper)
51: Second cover plate
53: Second front cover plate
531: Second spring cover portion
533: Third circumferential support portion
535: Second cover body portion
537: Second binding portion
538: Second fluid passageway
55: Second rear cover plate
551: Third spring cover portion
553: Fourth circumferential support portion
555: Third cover body portion
57: Second damper spring
571: Second damper large-diameter spring
573: Second damper small-diameter spring
59: Driven hub
591: Second neck portion
593: Hub body portion
595: Second damper side spline
70: Inner spline hub 71: Engine clutch side spline
80: Engine clutch
M2: Second rotor (second motor, drive motor)
90: Rotor hub

MODE FOR INVENTION

Hereinafter, exemplary embodiments of the present invention will be described in detail with reference to the accompanying drawings.

The present invention is not limited to the embodiments disclosed herein, but will be variously changed and implemented in various different forms. The embodiments are provided so that the present invention will be thorough and complete, and also to provide a more complete understanding of the scope of the present invention to those of ordinary skill in the art. Therefore, it should be understood that the present invention is not limited to the embodiments disclosed below, but the configuration of any one embodiment and the configuration of another embodiment can be substituted or added, and the present invention includes all alterations, equivalents, and alternatives that are included in the technical spirit and scope of the present invention.

It should be interpreted that the accompanying drawings are provided only to allow those skilled in the art to easily understand the exemplary embodiments disclosed in the present specification, and the technical spirit disclosed in the present specification is not limited by the accompanying drawings, and includes all alterations, equivalents, and alternatives that are included in the spirit and the technical scope of the present invention. In the drawings, sizes or thicknesses of constituent elements may be exaggerated, increased, or decreased for convenience of understanding, but the protection scope of the present invention should not be restrictively construed.

The terms used in the present specification are used only for the purpose of describing particular examples or embodiments and are not intended to limit the present invention. Further, singular expressions include plural expressions unless clearly described as different meanings in the context. In the present application, the terms "comprises," "comprising," "includes," "including," "containing," "has," "having", and other variations thereof are inclusive and therefore specify the presence of features, integers, steps, operations, elements, components, and/or combinations thereof disclosed in the specification. That is, in the present application, the terms "comprises," "comprising," "includes," "including," "containing," "has," "having", and other variations thereof do not preclude the presence or addition of one or more other features, integers, steps, operations, elements, components, and/or combinations thereof.

The terms including ordinal numbers such as "first," "second," and the like may be used to describe various constituent elements, but the constituent elements are not limited by the terms. These terms are used only to distinguish one constituent element from another constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements.

When one constituent element is described as being "disposed above" or "disposed below" another constituent element, it should be understood that one constituent element can be disposed directly on another constituent element, and an intervening constituent element can also be present between the constituent elements.

Unless otherwise defined, all terms used herein, including technical or scientific terms, have the same meaning as commonly understood by those skilled in the art to which the present invention pertains. The terms such as those defined in a commonly used dictionary should be interpreted as having meanings consistent with meanings in the context of related technologies and should not be interpreted as ideal or excessively formal meanings unless explicitly defined in the present application.

Because a hybrid drive module according to an embodiment is symmetrical with respect to an axis, only the half of the hybrid drive module based on the axis is illustrated for the convenience of illustration. In addition, for the convenience of description, a direction along a longitudinal direction of an axis defining a center of a rotation of the hybrid drive module is defined as an axial direction. That is, a forward/rearward direction or an axial direction is defined as a direction parallel to a rotation axis. A front (forward) means any one direction of a power source, e.g., a direction toward an engine. A rear (rearward) means the other direction, e.g., a direction toward a transmission. Therefore, a front surface means a surface facing forward, and a rear surface means a surface facing rearward.

A radial direction means a direction toward or away from a center of the rotation axis along a straight line passing through the center of the rotation axis on the plane perpendicular to the rotation axis. A direction radially away from the center is referred to as a centrifugal direction, and a direction toward the center is referred to as a centripetal direction.

A peripheral direction or a circumferential direction means a direction surrounding a periphery of the rotation axis. An outer periphery means an outer circumference, and an inner periphery means an inner circumference. Therefore, an outer peripheral surface is a surface facing away from the rotation axis, and an inner peripheral surface is a surface facing the rotation axis.

A circumferential surface means a surface, a normal line of which is directed in a circumferential direction.

First Embodiment

Hereinafter, a first embodiment of a torsional damper according to the present invention and a hybrid drive module, to which the torsional damper is applied, will be described with reference to FIGS. 1 to 4.

In the first embodiment according to the present invention, the hybrid drive module illustrated in FIG. 1 is configured such that a first motor M1 and a second motor M2 are installed in a cover 10. The first motor M1 may serve to start an engine or regenerate a rotational force of the engine to electrical energy, and the second motor M2 may provide driving power for moving a vehicle equipped with the corresponding hybrid drive module.

The hybrid drive module includes a rotor shaft 21 disposed at a front center of the cover 10, extending in an axial direction, and connected to the engine.

The rotor shaft 21 is connected to the cover 10 by means of a bearing and rotatably supported on the cover 10.

The rotor shaft 21 is integrally connected to a rotor sleeve 23. That is, the rotor sleeve 23 may receive the rotational force from the engine through the rotor shaft 21 and be rotatably supported on the cover 10.

The rotor sleeve 23 may include a radial extension portion 231 extending radially outward from the rotor shaft 21, and an axial extension portion 233 extending in the axial direction from a centrifugal end of the radial extension portion 231.

The radial extension portion 231 may extend in a shape substantially corresponding to a shape of the cover 10 on which the bearing for supporting the rotor shaft 21 is installed.

A first rotor M1 of the first motor is fixedly installed on an outer periphery of the axial extension portion 233.

The axial extension portion 233 may extend rearward from the centrifugal end of the radial extension portion 231. Therefore, a space, which may accommodate the torsional damper, is provided rearward of the radial extension portion 231 and provided radially inside the axial extension portion 233 on which the first rotor M1 is installed.

The second motor M2 may be disposed rearward of the first motor M1. The second motor M2 is provided on an outer periphery of a rotor hub 90, and a second rotor M2 of the second motor M2 is fixedly installed on the outer periphery of the rotor hub 90.

The rotor hub 90 is connected to an output terminal of the hybrid drive module. Further, the output terminal of the hybrid drive module is connected to a non-illustrated transmission. Therefore, a rotational force of the rotor hub 90 is transmitted to the transmission through the output terminal. That is, when the second motor M2 rotates, a rotational force of the second motor M2 is transmitted to the transmission.

The rotor sleeve 23 is connected to the rotor hub 90 through an engine clutch 80. Therefore, when the engine clutch 80 does not connect the rotor sleeve 23 and the rotor hub 90, only the rotational force of the second motor M2 is transmitted to the output terminal. When the engine clutch 80 connects the rotor sleeve 23 and the rotor hub 90, both the rotational force of the second motor M2 and the rotational force of the engine are transmitted to the output terminal.

The engine clutch 80 is installed radially inside the rotor hub 90. In the first embodiment, an axial position of a front end of the second rotor M2, an axial position of a front end of the rotor hub 90, and an axial position of a front end of the engine clutch 80 are illustrated as being consistent with one another. The first embodiment exemplarily provides a torsional damper structure in which a second damper 50 of a second embodiment to be described below is not provided. The first embodiment exemplarily provides a structure in which the engine clutch 80 is disposed as forward as possible in order to ensure the space provided rearward of the rotor hub 90.

Although not illustrated, the second rotor M2 and the rotor hub 90 may extend forward further than the engine clutch 80. Then, a space, which may accommodate the torsional damper, is further provided forward of the engine clutch 80 and provided radially inside the rotor hub 90 on which the second rotor M2 is installed. This configuration may provide a space in which the second damper 50 of the second embodiment to be described below may be accommodated.

The torsional damper may include a first damper 30.

In a drive system, the torsional damper is positioned between the rotor sleeve 23 and the engine clutch 80.

The engine clutch 80 may be locked up or unlocked by being pressed or released by a piston plate (not illustrated) disposed rearward of the engine clutch 80. That is, the engine clutch 80 may be locked up when the piston plate moves forward and presses friction plates of the engine clutch 80 forward, and the engine clutch 80 may be unlocked when the piston plate moves rearward and releases the friction plates.

When the piston plate presses the engine clutch 80, the torsional damper connected to the engine clutch 80 may also be affected by a force that presses the engine clutch 80 forward. Therefore, the torsional damper and the engine clutch 80 may be connected to splines 359 and 71. Then, the rotation of the torsional damper and/or the rotation of the engine clutch 80 are restricted relative to each other, but the influence of the axial movement of the engine clutch 80 on the torsional damper may be minimized.

Because the first damper 30 is disposed in the cover 10 of the hybrid drive module connected to the automatic transmission, a wet damper, which is cooled by the transmission oil, may be configured.

The first damper 30 may be disposed radially inside the first rotor M1. Therefore, it is possible to minimize or almost eliminate a space that the hybrid drive module occupies in the axial direction by the torsional damper.

The first damper 30 includes a first cover plate 31 provided at a driving side, a driven plate 35 provided at a driven side, and a first damper spring 33 interposed between the driving side and the driven side.

A front side of the first damper spring 33 is supported by the rotor sleeve 23, and a rear side of the first damper spring 33 is supported by the first cover plate 31.

The front side of the first damper spring 33 is supported by the radial extension portion 231 of the rotor sleeve 23, and a radially outer side of the first damper spring 33 is supported by the axial extension portion 233 of the rotor sleeve 23.

A spring guide G is interposed between the first damper spring 33 and the axial extension portion 233 to prevent the first damper spring 33 from being in direct contact with the axial extension portion 233.

Figure 4:
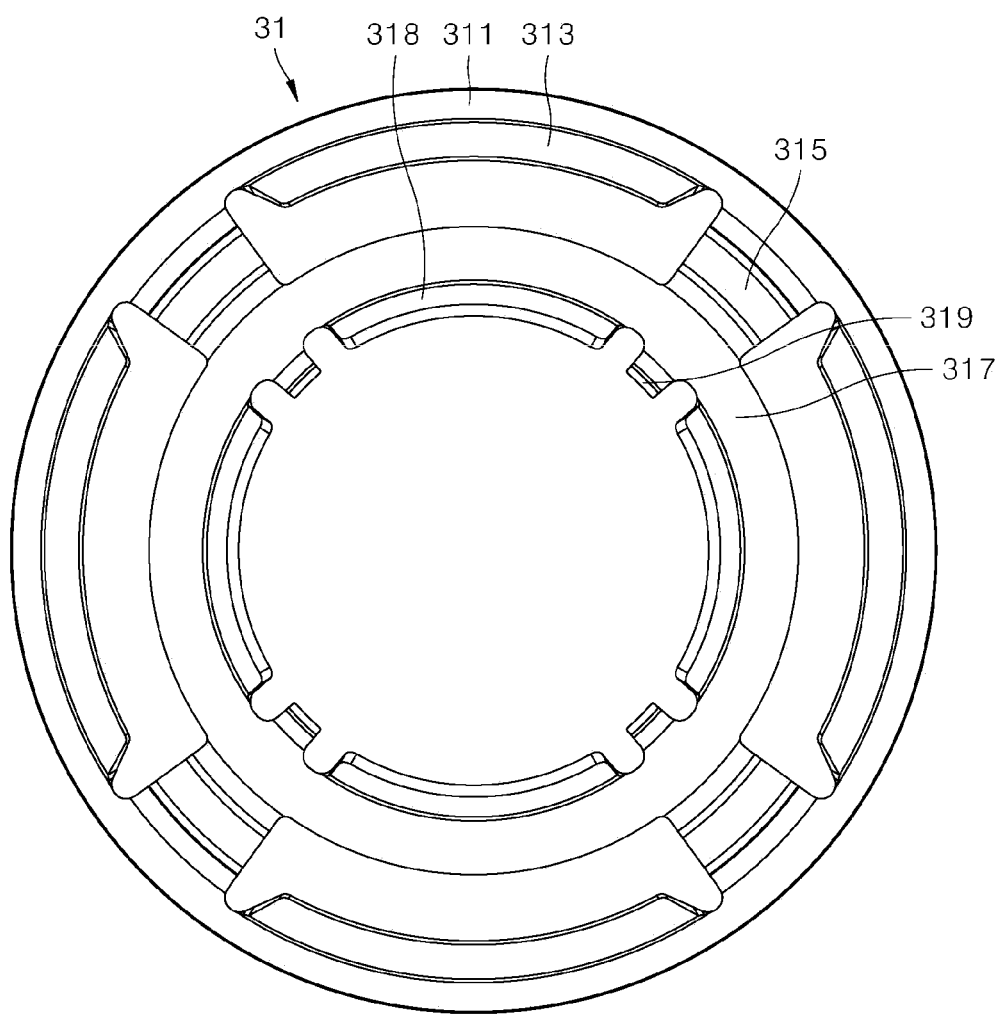
FIG. 4 is a front view of the first cover plate of the torsional damper of the first embodiment.
Figure 5:
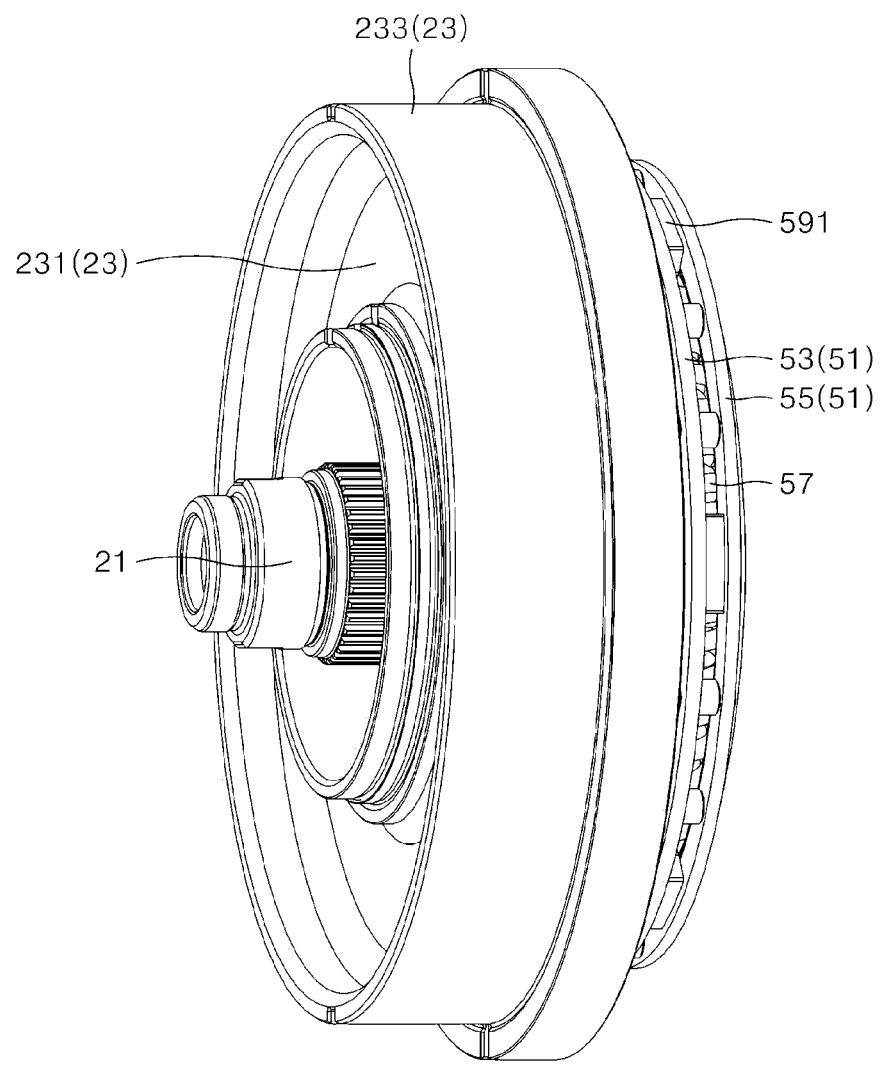
FIG. 5 is a perspective view of a torsional damper of a second embodiment according to the present invention.
Figure 6:
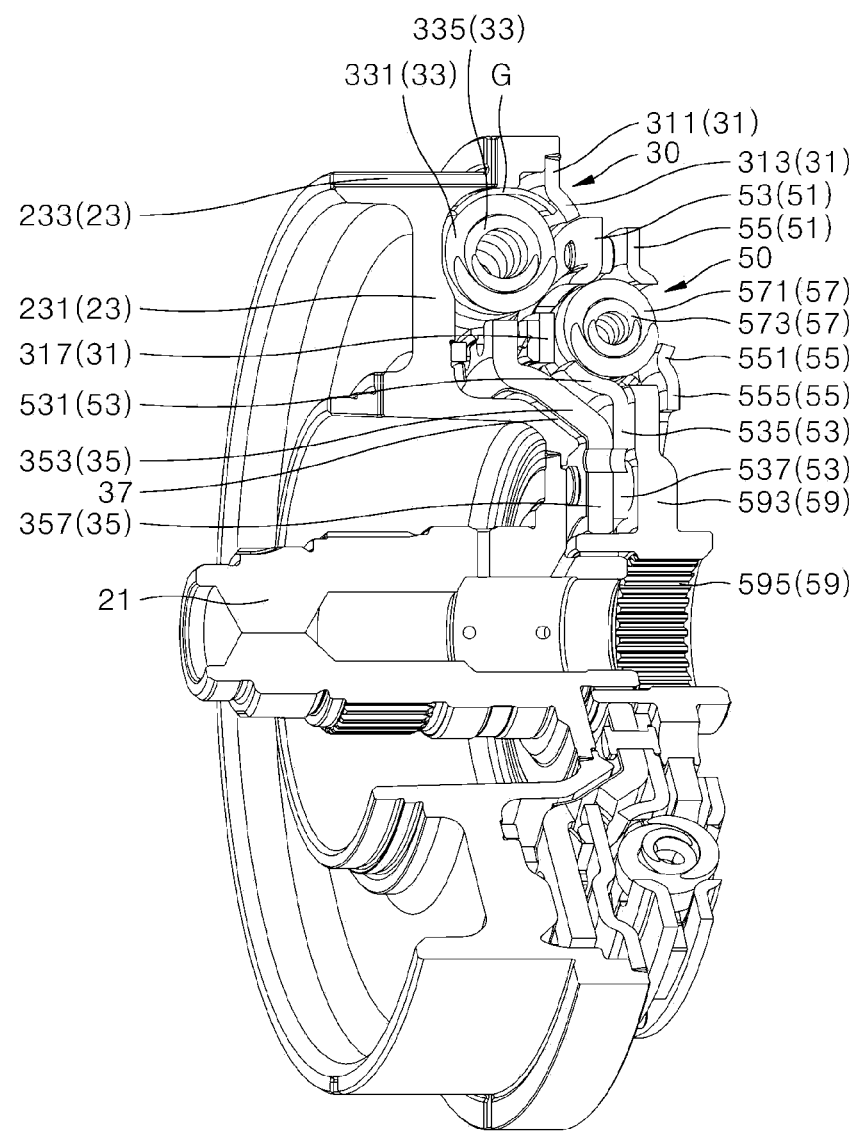
FIG. 6 is a cross-sectional perspective view of the torsional damper in FIG. 5.
Figure 7:
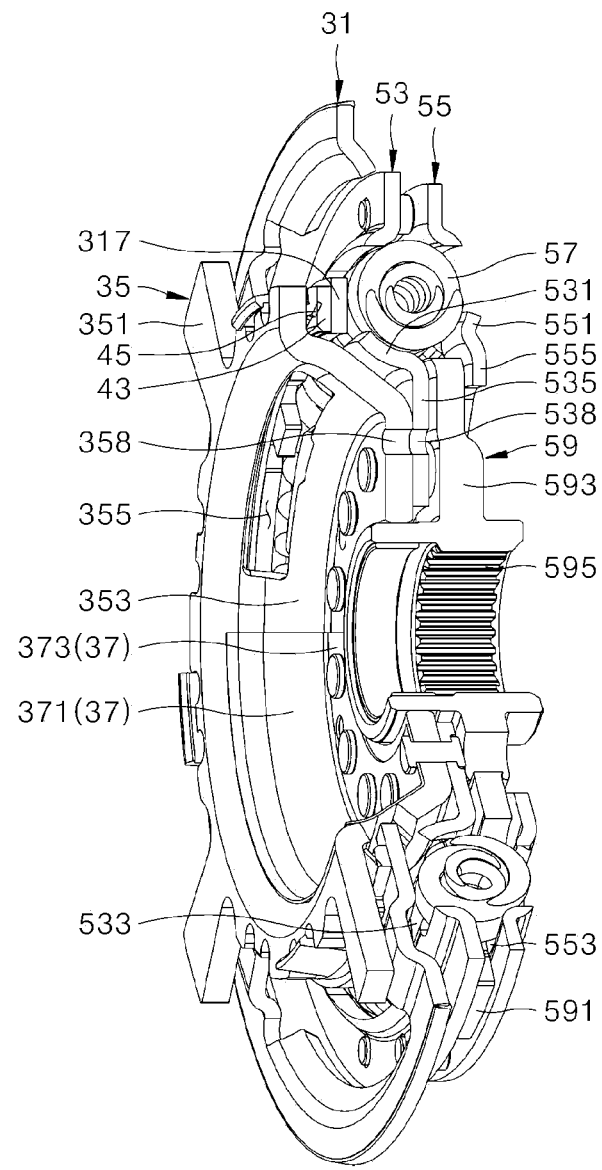
FIG. 7 is a view illustrating a first cover plate, a first hysteresis device, a driven plate, a part of a baffle plate, a second cover plate, a second damper spring, and a driven hub of the torsional damper in FIG. 6.
Figure 8:
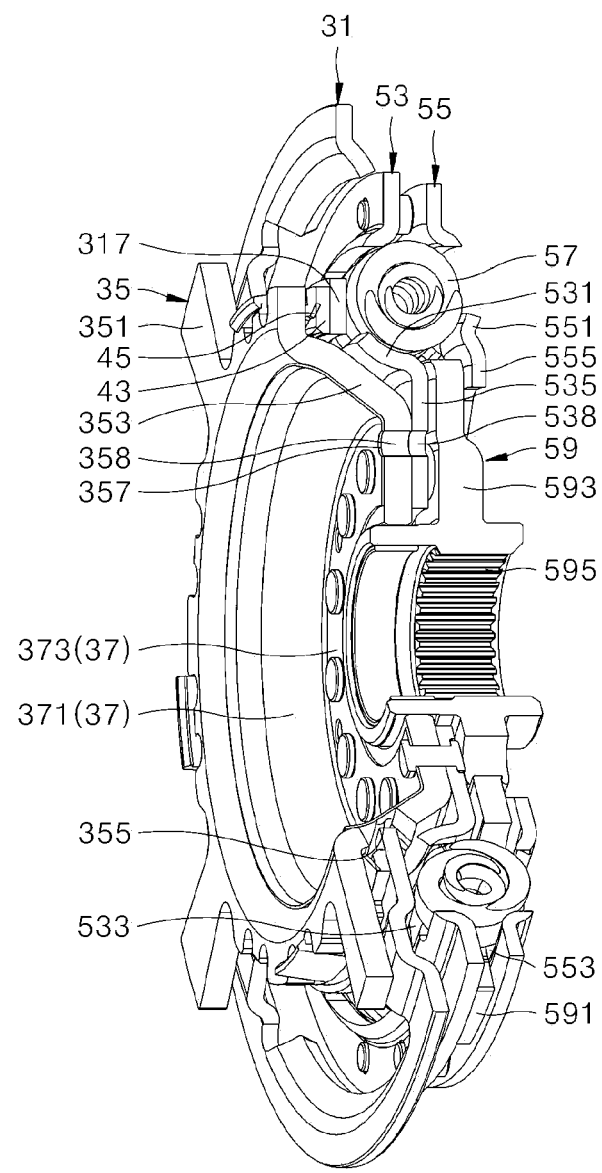
FIG. 8 is a view illustrating the entire baffle plate in FIG. 7.

The first damper spring 33 may be provided as a plurality of first damper springs 33 disposed in the circumferential direction. With reference to FIG. 4, the embodiment exemplarily provides a structure in which four first damper springs are disposed at equal intervals in the circumferential direction. The first damper springs are disposed in an arc shape.

The first damper springs 33 may include a first damper large-diameter spring 331 and a first damper small-diameter spring 333 that define concentricity.

Two opposite ends of the first damper spring 33 may be supported by the rotor sleeve 23 and also supported by the first cover plate 31.

A plurality of first circumferential support portions 235 is provided on the rotor sleeve 23 and each has a rib shape protruding rearward. The plurality of first circumferential support portions 235 is provided at predetermined positions in the circumferential direction. The plurality of first circumferential support portions 235 supports the two opposite ends each of the first damper springs 33 in the circumferential direction. According to the embodiment, eight first circumferential support portions 235 may be provided.

The first circumferential support portion 235 is provided at a portion where the radial extension portion 231 and the axial extension portion 233 of the rotor sleeve 23 are connected. The first circumferential support portion 235 not only reinforces the rigidity of the rotor sleeve 23 but also supports the first damper spring 33 in the circumferential direction. In addition, a radial inner surface of the first circumferential support portion 235 restricts a radial position of a first front friction washer 41 of a first hysteresis device 40 to be described below.

The first cover plate 31 is disposed radially outward of the first damper spring 33 and connected to the rotor sleeve 23. Specifically, the first cover plate 31 includes a centrifugal side fixing portion 311 extending radially outward further than the first damper spring 33, and the centrifugal side fixing portion 311 is connected to a rear end of the axial extension portion 233 of the rotor sleeve 23 and integrally moves.

The first cover plate 31 includes a first cover body portion 317, a plurality of first spring cover portions 313 provided radially outside the first cover body portion 317 and configured to accommodate the first damper springs 33, second circumferential support portions 315 disposed between the first spring cover portions 313 and configured to support the first damper springs 33 in the circumferential direction, the centrifugal side fixing portion 311 extending radially outward from the first spring cover portion 313, a first stopper 319 extending radially inward from the first cover body portion 317, and oil dams 318 radially inward from the first cover body portion 317.

The first damper spring 33 is supported by the first spring cover portion 313 of the first cover plate 31 in the rearward direction and the radial direction. With reference to FIG. 4, the embodiment exemplarily provides four first spring cover portions 313.

The two opposite ends of each of the four first damper springs 33 are supported by each of the four second circumferential support portions 315 provided between the four first spring cover portions 313. That is, one second circumferential support portion 315 supports the ends of the two first damper springs 33 that face each other when the two first damper springs 33 are adjacent to each other in the circumferential direction.

According to the embodiment, the first damper spring 33 is supported radially outward by the axial extension portion 233 of the rotor sleeve 23, and the first cover plate 31 is connected to the axial extension portion 233, such that a radius from a rotation center axis to the first damper spring 33 may be maximally ensured.

The driven plate 35 includes a driven body portion 353 having a first stopper accommodation portion 355 configured to accommodate the first stopper 319, a first neck portion 351 extending radially outward from the driven body portion 353, and a first damper side spline 359 provided at a centripetal side end of the driven body portion 353.

Figure 2:
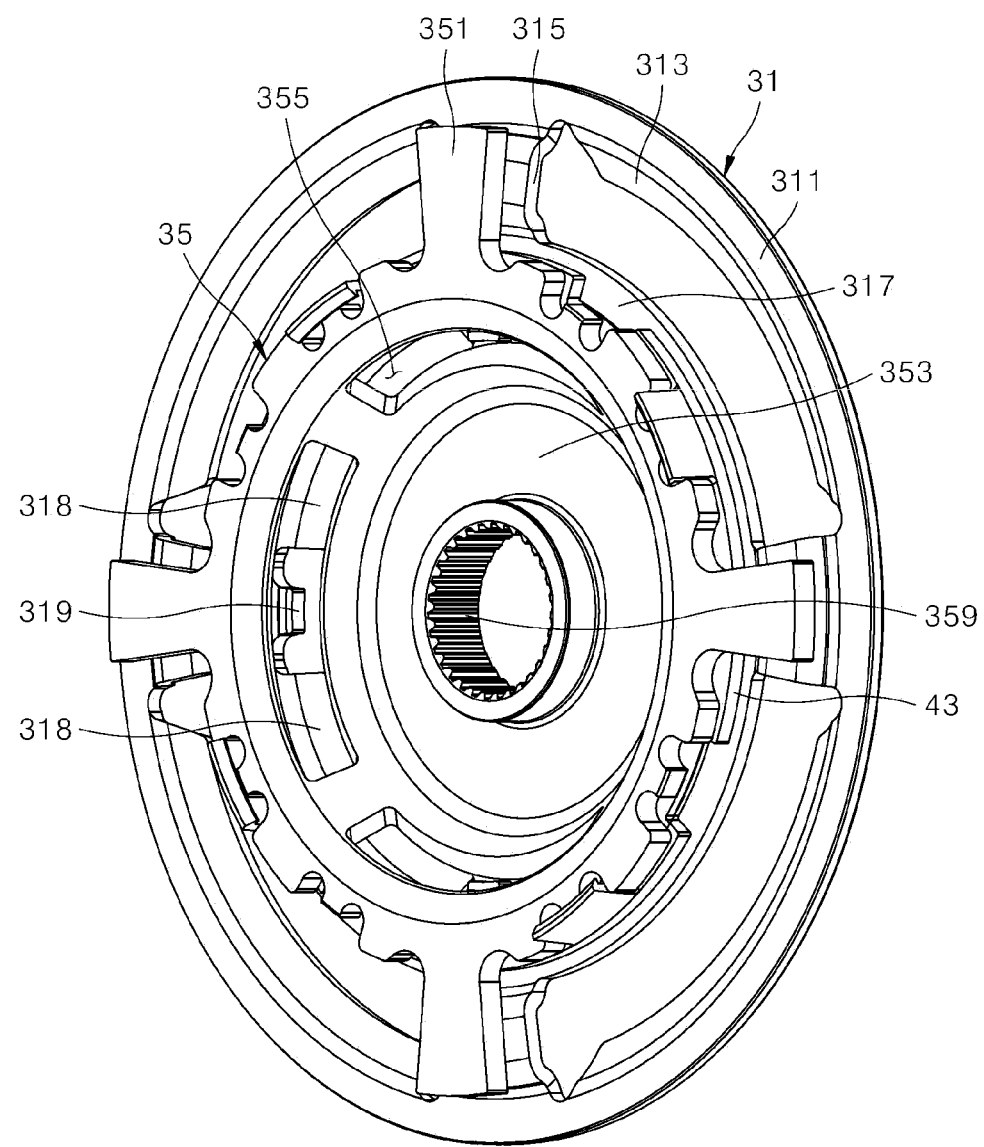
FIGS. 2 and 3 are a perspective view and a cross-sectional perspective view illustrating a first rear friction washer, a driven plate, and a first cover plate of a first damper of the torsional damper illustrated in FIG. 1.
Figure 3:
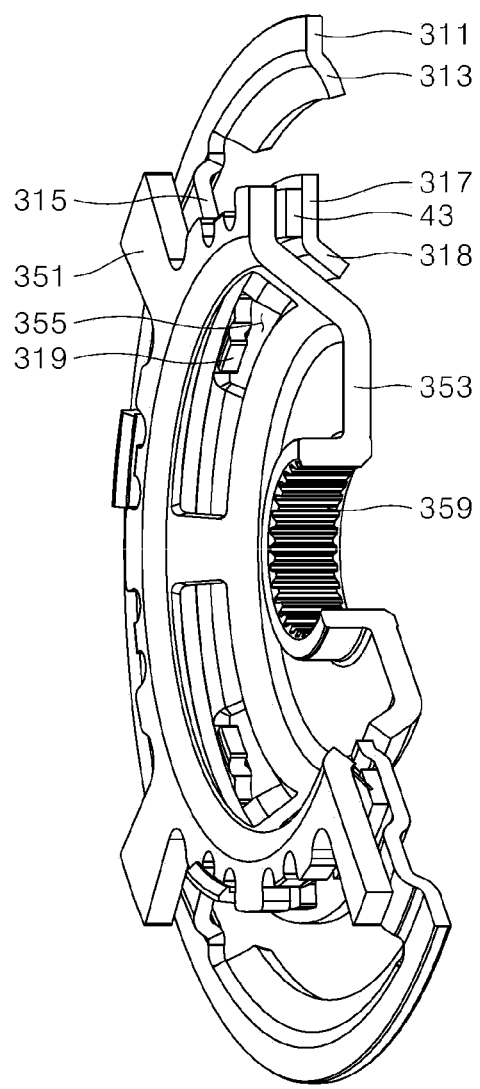

The first stopper accommodation portion 355 and the first stopper 319, which is accommodated in the first stopper accommodation portion 355, define a range in which the first cover plate 31 may rotate relative to the driven plate 35. The first stopper accommodation portion 355 may be a long hole having an arc shape. That is, the first cover plate 31 may rotate relative to the driven plate 35 by an extra portion made by subtracting a circumferential width of the first stopper 319 from a length of the long hole of the first stopper accommodation portion 355. Then, it is possible to prevent the first damper spring 33 from being excessively compressed. The first stopper 319 may be provided as a plurality of first stoppers 319, and the first stopper accommodation portions 355 may also be provided to correspond in number to the first stoppers 319. With reference to FIGS. 2 to 4, the embodiment exemplarily provides a configuration in which four first stoppers and four first stopper accommodation portions are provided. Of course, it is apparent that the first stoppers and the first stopper accommodation portions are disposed at equal intervals in the circumferential direction.

The first stopper accommodation portion 355 is provided in an inclined section of the driven body portion 353 that extends in the radial direction in a shape inclined with respect to the axial direction. The inclined section may have a shape inclined forward as the driven body portion 353 extends radially outward. Therefore, the first stopper 319 may be accommodated in the first stopper accommodation portion 355 only by simply stacking the first cover plate 31 and the driven plate 35 in the axial direction.

The rotor sleeve 23 may have a flow path through which the transmission oil is supplied to a space provided radially inward of the inclined section. Therefore, oil may be supplied to a radial inner space of the inclined section of the driven body portion 353, and the oil may flow radially outward by receiving a centrifugal force by the rotating torsional damper.

Because the first stopper accommodation portion 355 provided on the driven body portion 353 is formed in the inclined section, the first stopper accommodation portion 355 has a shape opened not only in the axial direction but also in the radial direction. Further, the first stopper accommodation portion 355 is in an opened state in the circumferential direction by a section in which a relative rotation is allowable even in a state in which the first stopper 319 is accommodated.

The most amount of oil, which flows radially outward from the radial inner space of the inclined section, is discharged through the first stopper accommodation portion 355. Then, the oil may flow in a radially outward direction of the first damper 30 without wetting a portion of the first damper spring 33 and a portion in the vicinity of the first hysteresis device 40 where a large amount of friction occurs.

Therefore, in the present invention, a shield member is provided to block the first stopper accommodation portion 355 to prevent a situation in which the oil is immediately discharged radially outward through the first stopper accommodation portion 355 as described above. According to the first embodiment, the shield member may be the oil dam 318 formed radially inside the first cover body portion 317.

The oil dam 318 extends radially inward from the first cover body portion 317 in a shape corresponding to the shape in which the inclined section of the driven body portion 353 is inclined with respect to the axial direction. That is, the oil dam 318 may have a shape inclined rearward as the oil dam 318 extends radially inward from the first cover body portion 317.

Further, the oil dam 318 is not accommodated in the first stopper accommodation portion 355 so as not to interfere with the driven plate 35. The oil dam 318 has a shape that is disposed radially outside the first stopper accommodation portion 355 and covers the first stopper accommodation portion 355.

With reference to FIG. 4, the oil dams 318 and the first stoppers 319 are alternately disposed in the circumferential direction. Therefore, the number of oil dams 318 corresponds to the number of first stoppers 319. The embodiment exemplarily provides a structure in which four oil dams 318 are provided.

The oil dam 318 may be formed to cover all the remaining sections, which exclude the section in which the first stopper 319 is formed, in the circumferential direction. The oil dam 318 may be provided by cutting an inner end of the driven plate 35 at a boundary portion between a section, in which the first stopper 319 is to be provided, and a section, in which the oil dam 318 is to be provided, and performing processing, such as pressing, on a portion corresponding to the oil dam 318. This processing may be performed together with a process of forming the first stopper 319, and as a result, the shield member is formed without increasing the number of manufacturing processes.

Then, the oil is mostly guided by the oil dam 318 except for oil discharged radially outward through a small space opened by the first stopper 319, and the oil moves through a space between the radial extension portion 231 of the rotor sleeve 23 and the first cover body portion 317 of the first cover plate 31 and flows while wetting the first hysteresis device 40 and the first damper spring 33.

The second embodiment to be described below exemplarily provides a shape in which the second damper is further connected in series to the first damper. According to the structure, the oil needs to be supplied not only to the first damper but also to the second damper. According to the above-mentioned structures of the first stopper 319 and the oil dam 318 of the first embodiment, the oil, which is supplied to the radial inner space of the inclined section of the driven body portion 353, may be supplied to the second damper while being discharged radially outward through a small space opened by the first stopper 319. Therefore, in case that the second damper is connected in series to a rear side of the first damper, as in the second embodiment, the amount of oil to be supplied to the first damper and the second damper may be designed by adjusting a width of the first stopper 319, a width of the oil dam 318, and/or an interval between the first stopper 319 and the oil dam 318.

The first neck portion 351 may be disposed between the first circumferential support portion 235 of the rotor sleeve 23 and the second circumferential support portion 315 of the first cover plate 31 in the axial direction.

A circumferential width of the first neck portion 351 may be slightly smaller than a circumferential width of the second circumferential support portion 315. Then, it is possible to provide a free-angle section in which the driven plate 35 may rotate relative to the first cover plate 31 without compressing the first damper spring 33.

The first damper side spline 359 engages with an engine clutch side spline 71 provided on an outer peripheral surface of an inner spline hub 70 connected to the engine clutch 80 so that a rotation thereof is restricted. Therefore, the rotation of the first damper 30 and the rotation of the engine clutch 80 are restricted in the rotation direction, and the first damper 30 and the engine clutch 80 are allowed to relatively slide in the axial direction.

When the rotational force of the engine is transmitted to the first cover plate 31 through the rotor shaft 21 and the rotor sleeve 23, the first damper spring 33, which is supported by the first cover plate 31, presses the first neck portion 351 in the rotation direction and transmits the rotational force to the driven plate 35. In this case, the first damper spring 33 absorbs a non-uniform rotational force of the engine, uniformizes the rotational force to some extent, and then transmits the rotational force to the driven plate 35. Then, the output of the engine is uniformized and transmitted to the rotor hub 90 through the engine clutch 80.

According to the embodiment, a free angle is imparted to the first damper 30. Therefore, when the rotational force of the engine is transmitted to the torsional damper, the free angle may be consumed, and the rotational force of the engine may be transmitted to the rotor hub 90.

With reference to FIG. 1, the first hysteresis device is provided in the first damper 30 of the torsional damper of the embodiment and provides first hysteresis torque to the first damper 30. When the hysteresis torque is provided to the damper as described above, an effect of reducing noise may be further improved, and in particular, the effect of reducing noise may be further improved when the engine idles.

The first hysteresis device 40 includes the first front friction washer 41 disposed between the radial extension portion 231 of the rotor sleeve 23 and the driven body portion 353 of the driven plate 35 in the axial direction, a first rear friction washer 43 disposed between the driven body portion 353 and the first cover body portion 317 of the first cover plate 31 in the axial direction, and a first elastic washer 45 disposed between the driven body portion 353 and the first rear friction washer 43 in the axial direction.

The first rear friction washer 43 may have a hook portion extending forward while penetrating the driven body portion 353, and the hook portion may interfere with a front surface of the driven body portion 353. A radial position of the first rear friction washer 43 is restricted by the driven body portion 353.

The radial position of the first elastic washer 45 is restricted as an outer peripheral surface of the first elastic washer 45 comes into contact with an inner peripheral surface of the hook portion of the first rear friction washer 43.

The first elastic washer 45 is disposed between the driven plate 35 and the first rear friction washer 43 in a state in which a preload is applied. Further, the first hysteresis torque Tl is intuitively determined by the preload of the first elastic washer 45.

In this case, the first elastic washer 45 is disposed rearward of the driven plate 35. Then, the first elastic washer 45 presses the driven plate forward. As illustrated in FIG. 1, the driven plate 35 is disposed at a foremost side with respect to the first cover plate 31 within an allowable range by the first elastic washer 45.

When the engine clutch 80 is pressed forward by the piston plate, the driven plate 35 connected to the engine clutch 80 may receive a forward axial force even though the spline connection is made. However, because the first damper 30 has been already moved and disposed at the foremost side by the first elastic washer 45 within the allowable range by the friction washers 41 and 43 as described above, the axial force is never transmitted to the first elastic washer 45. Therefore, the torsional damper installed in the hybrid drive module of the embodiment consistently applies a designed preload to the driven plate 35.

This means that the designed hysteresis torque does not change even under varying operating conditions. That is, according to the embodiment, the first elastic washer 45, which provides hysteresis torque to the first damper 30, may provide intended hysteresis torque by applying an elastic force to the first damper 30 in response to a designed preload regardless of whether the engine clutch 80 operates.

The above-mentioned first embodiment exemplarily provides the single damper shape in which the torsional damper has the first damper 30. However, the torsional damper of the first embodiment may, of course, have a damper shape in which the second damper 50 is further connected in series, as in the second embodiment to be described below.

Second Embodiment

Hereinafter, the second embodiment of the torsional damper according to the present invention will be described with reference to FIGS. 5 to 9. The second embodiment differs from the first embodiment in that the shield member is differently configured, and the second damper is further connected to the first damper in series. Therefore, the description will be focused on the difference.

The torsional damper may further include the second damper 50 connected in series to the rear side of the first damper 30 in the drive system. As described above, the low-rigidity design may be implemented when the torsional damper is configured by connecting the first damper 30 and the second damper 50 in series.

Like the first damper 30, the second damper 50 is also disposed in the cover 10 of the hybrid drive module connected to the automatic transmission, such that a wet damper, which is cooled by the transmission oil, may be configured.

The first damper 30 may be disposed radially inside the first rotor M1, and the second damper 50 may be provided axially rearward of the first rotor M1 and disposed radially inside the second rotor M2. Therefore, it is possible to minimize or almost eliminate the space that the hybrid drive module occupies in the axial direction by the torsional damper.

The first cover plate 31 includes the first cover body portion 317, the plurality of first spring cover portions 313 provided radially outside the first cover body portion 317 and configured to accommodate the first damper springs 33, the second circumferential support portions 315 disposed between the first spring cover portions 313 and configured to support the first damper springs 33 in the circumferential direction, the centrifugal side fixing portion 311 extending radially outward from the first spring cover portion 313, and the first stopper 319 extending radially inward from the first cover body portion 317.

According to the second embodiment, the oil dam 318 provided on the first cover plate 31 of the first embodiment is excluded so that the second damper 50 is disposed to be closer to the first damper 30, such that the second damper 50 may be disposed to be closer to the first damper 30. Therefore, in the second embodiment, in order to prevent an increase in axial dimension of the torsional damper, a baffle plate 37, which serves as a shield member configured to block a flow of oil, is attached to the radial inner surface of the inclined section of the driven body portion 353 of the driven plate 35 of the first damper 30.

The driven plate 35 includes the driven body portion 353 having the first stopper accommodation portion 355 configured to accommodate the first stopper 319, the first neck portion 351 extending radially outward from the driven body portion 353, and a first binding portion 357 provided at the centripetal side end of the driven body portion 353.

According to the second embodiment, because the second damper 50 is connected in series to the rear side of the first damper 30, the first binding portion 357, instead of the first damper side spline 359, is provided at the centripetal side end of the driven plate 35.

The first binding portion 357 is connected to a second binding portion 537 of a second front cover plate 53 of a second cover plate 51 of the second damper 50, which will be described below, and transmits a driven side rotational force of the first damper 30 to a driving side of the second damper 50.

Figure 9:
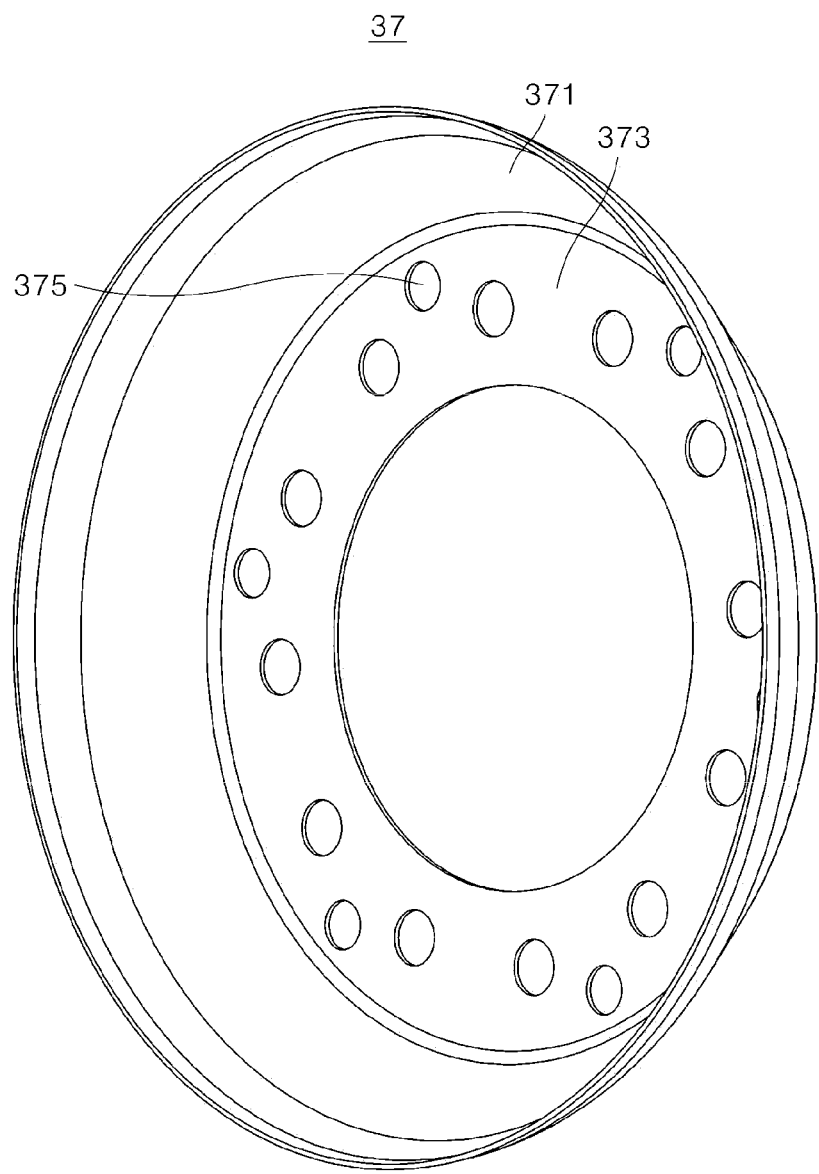
FIG. 9 is a perspective view of the baffle plate.

According to the second embodiment, the baffle plate 37, which serves as the shield member and is illustrated in FIG. 9, is attached to the driven body portion 353. The baffle plate 37 may have a shape corresponding to a shape of a region of the driven plate 35 to which the baffle plate 37 is attached. The baffle plate 37 does not need to have the rigidity for transmitting the rotational force, and the baffle plate 37 only needs to have the rigidity that may guide the flow of oil.

The baffle plate 37 may be tightly attached and fixed to the radial inner surface of the inclined section of the driven body portion 353, i.e., the front surface of the driven plate 35. The driven plate 35 covers the first stopper accommodation portion 355 without entering a region of a trajectory along which the first stopper 319 moves in the first stopper accommodation portion 355.

The baffle plate 37 includes a baffle body portion 371 configured to adjoin the front surface of the driven body portion 353 while covering the first stopper accommodation portion 355 provided on the driven body portion 353, and a third binding portion 373 configured to fix the baffle body portion 371 to the driven plate 35.

The baffle body portion 371 may cover a portion corresponding to the inclined section of the driven body portion 353.

The third binding portion 373 may be disposed radially inside the baffle body portion 371 and have a shape corresponding to the first binding portion 357 of the driven plate 35.

The third binding portion 373 may have a shape corresponding to the first binding portion 357 and the second binding portion 537. For example, the first binding portion 357, the second binding portion 537, and the third binding portion 373 may have through-holes provided at positions corresponding to one another, and the first binding portion 357, the second binding portion 537, and the third binding portion 373 may be fastened altogether by means of common fastening means such as rivets. Then, the baffle plate 37 may be coupled together during a process of coupling the driven plate 35 and the second cover plate 51, which needs to be performed anyway, without adding a process of separately fixing the baffle plate to the driven plate 35.

The baffle plate 37 does not need to have the rigidity for transmitting the rotational force of the engine to the rotor hub 90. The transmission oil, which serves to cool and lubricate the wet damper, only needs to move along the inclined section of the driven body portion 353 and be guided to flow to the first hysteresis device 40 and the first damper spring 33 without being discharged through the first stopper accommodation portion 355. Therefore, the baffle plate 37 may be manufactured by using a much thinner material than the material of the driven plate 35, which may reduce the weight.

Meanwhile, as described above with reference to the first embodiment, the oil needs to be supplied to the second damper 50 connected in series to the first damper 30, as in the second embodiment. Further, in a design step, the amount of oil to be supplied to the first damper 30 and the second damper 50 may be appropriately distributed.

In the second embodiment, because the first stopper accommodation portion 355 is shielded by the baffle plate 37, the oil, which is supplied to the radial inner space of the inclined section of the driven body portion 353, is supplied to the first hysteresis device 40 and the first damper spring 33 without being discharged through the first stopper accommodation portion 355.

Therefore, in the second embodiment, fluid passageways 358, 375, and 538 are provided to allow a part of the oil, which is supplied to the first damper, to move toward the second damper, such that a part of the oil, which is supplied to the radial inner space of the inclined section of the driven body portion 353, is also supplied to a second hysteresis device and a second damper spring 57.

In order to accurately design and control a flow path of the fluid, the fluid passageways may be provided at portions where the driven plate 35, the second cover plate 51, and the baffle plate 37 are in contact with one another. The fluid passageway may include a first fluid passageway 358 provided on the driven plate 35, a second fluid passageway 538 provided on the second cover plate 51, and a third fluid passageway 375 provided on the baffle plate 37.

The first fluid passageway 358 may be formed on the first binding portion 357 of the driven plate 35, the second fluid passageway 538 may be formed on the second binding portion 537 of the second front cover plate 53, and the third fluid passageway 375 may be formed on the third binding portion 373 of the baffle plate 37. Further, the third fluid passageway 375, the first fluid passageway 358, and the second fluid passageway 538 may constitute a single fluid passageway extending substantially in the axial direction.

Therefore, the amount of oil to be supplied to the first damper and the second damper may be designed by adjusting the sizes of the fluid passageways and the number of fluid passageways.

The second damper 50 includes the second cover plate 51 provided at the driving side, a driven hub 59 provided at the driven side, and the second damper spring 57 interposed between the driving side and the driven side.

The second cover plate 51 includes the second front cover plate 53 provided at the front side and a second rear cover plate 55 provided at the rear side with the second damper spring 57 interposed therebetween. The second front cover plate 53 and the second rear cover plate 55 may be fastened to each other at a radial outer end and integrally moved.

A front side of the second damper spring 57 is supported by the second front cover plate 53, and a rear side of the second damper spring 57 is supported by the second rear cover plate 55. In addition, the second front cover plate 53 and the second rear cover plate 55 support the second damper spring 57 in the radial direction.

The second damper spring 57 may be provided as a plurality of second damper springs 57 disposed in the circumferential direction. The embodiment exemplarily provides a structure in which four second damper springs 57 are disposed at equal intervals in the circumferential direction.

The second damper springs 57 may include a second damper large-diameter spring 571 and a second damper small-diameter spring 573 that define concentricity.

The second damper spring 57 is disposed in an arc shape.

The second front cover plate 53 includes a second cover body portion 535, the second binding portion 537 provided at a radial inner end of the second cover body portion 535 and bound to the first binding portion 357, a second spring cover portion 531 configured to support a front side of the second damper spring 57 and accommodate a front half side of the second damper spring 57 to support the second damper spring 57 in the radial direction, and a third circumferential support portion 533 configured to support the second damper spring 57 in the circumferential direction.

The second rear cover plate 55 includes a third cover body portion 555, a third spring cover portion 551 configured to support a rear side of the second damper spring 57 and accommodate a rear half side of the second damper spring 57 to support the second damper spring 57 together with the second spring cover portion 531 in the radial direction, and a fourth circumferential support portion 553 configured to support the second damper spring 57 together with the third circumferential support portion 533 in the circumferential direction.

The embodiment exemplarily provides four second spring cover portions 531 and four third spring cover portions 551.

In addition, the embodiment exemplarily provides four third circumferential support portions 533 and four fourth circumferential support portions 553.

The four third circumferential support portions 533, which are provided between the four second spring cover portions 531, and the four fourth circumferential support portions 553, which are provided between the four third spring cover portions 551, support two opposite ends of the four second damper springs 57. That is, one third circumferential support portion 533 and one fourth circumferential support portion 553, which face each other in the axial direction, support the ends of the two second damper springs 57 that face each other when the two second damper springs 57 are adjacent to each other in the circumferential direction.

The driven hub 59 includes a hub body portion 593, a second neck portion 591 extending radially outward from the hub body portion 593, and a second damper side spline 595 provided at a centripetal side end of the driven body portion 353.

The second neck portion 591 may be disposed between the third circumferential support portion 533 of the second front cover plate 53 and the fourth circumferential support portion 553 of the second rear cover plate 55 in the axial direction.

A circumferential width of the third circumferential support portion 533 and a circumferential width of the fourth circumferential support portion 553 may correspond to each other. Further, a circumferential width of the second neck portion 591 may be slightly smaller than a circumferential width of each of the third and fourth circumferential support portions 533 and 553. Therefore, the second damper 50 may have a free angle.

Then, a sum of a free angle of the first damper 30 and a free angle of the second damper 50 may define a free angle of the torsional damper.

The damper side spline 595 is provided on an inner peripheral surface of the hub body portion 593. Further, the damper side spline 595 engages with the engine clutch side spline 71 provided on the outer peripheral surface of the inner spline hub 70 connected to the engine clutch 80 so that a rotation thereof is restricted. Therefore, the rotation of the second damper 50 and the rotation of the engine clutch 80 are restricted in the rotation direction, and the second damper 50 and the engine clutch 80 are allowed to relatively slide in the axial direction.

When the rotational force of the engine is transmitted to the first cover plate 31 through the rotor shaft 21 and the rotor sleeve 23, the first damper spring 33, which is supported by the first cover plate 31, presses the first neck portion 351 in the rotation direction and transmits the rotational force to the driven plate 35. In this case, the first damper spring 33 absorbs a non-uniform rotational force of the engine, uniformizes the rotational force to some extent, and then transmits the rotational force to the driven plate 35.

Further, the rotational force transmitted to the driven plate 35 is transmitted to the second cover plate 51, and the second damper spring 57 is supported by the second cover plate 51 presses the second neck portion 591 in the rotation direction and transmits the rotational force to the driven hub 59. In this case, the second damper spring 57 also absorbs and uniformizes a non-uniform output and then transmits the output to the driven hub 59.

Then, the output of the engine is uniformized and transmitted to the rotor hub 90 through the engine clutch 80.

In this case, a damping force of the second damper 50 may be designed to be higher than a damping force of the first damper 30. Therefore, the low non-uniformity of the output may be mainly covered by the first damper, and the non-uniform output, which exceeds the damping force of the first damper, is covered by the second damper.

According to the second embodiment, free angles are imparted to both the first damper 30 and the second damper 50. Then, when the rotational force of the engine is transmitted to the torsional damper, the free angle of the first damper 30 may be consumed first, and then the free angle of the second damper 50 may be consumed, such that the rotational force of the engine may be transmitted to the rotor hub 90.

When the free angle, which the torsional damper needs to have, is uniformly distributed to the first damper 30 and the second damper 50, as described above, maximum circumferential widths of the first neck portion 351 and the second neck portion 591 may be ensured.

Although not illustrated, like the first hysteresis device 40 installed on the first damper 30, the second hysteresis device, which provides second hysteresis torque, may also be installed on the second damper 50. Similar to the first hysteresis device, the second hysteresis device may also include a second front friction washer disposed between the second cover body portion 535 of the second front cover plate 53 and the hub body portion 593 of the driven hub 59 in the axial direction, a second rear friction washer disposed between the hub body portion 593 and the third cover body portion 555 of the second rear cover plate 55 in the axial direction, and a second elastic washer disposed between the hub body portion 593 and the second rear friction washer 63 in the axial direction. Then, the second elastic washer is disposed between the driven hub 59 and the second rear friction washer 63 in a state in which a preload is applied, such that the second hysteresis torque may be intuitively determined by the preload of the second elastic washer.

When the hysteresis torque is provided to both the two dampers connected in series as described above, the effect of reducing noise may be further improved, and in particular, the effect of reducing noise may be further improved when the engine idles. In this case, when the second hysteresis torque is higher than the first hysteresis torque, the resonance of both the first damper 30 and the second damper 50 is suppressed by hysteresis torque in the idling state of the engine, thereby suppressing noise.

In this case, both the first elastic washer 45 and the second elastic washer are disposed rearward of the driven plate 35 and the driven hub 59. Therefore, because both the first elastic washer 45 and the second elastic washer press the driven plate and the driven hub forward, the elastic forces of the two elastic washers may be fully applied to the dampers without affecting each other.

With reference to FIG. 1, the driven plate 35 is disposed at a foremost side with respect to the first cover plate 31 within an allowable range by the first elastic washer 45. Therefore, the second cover plate 51 bound to the driven plate 35 is also disposed to be closest to the first cover plate 31. Further, the driven hub 59 is disposed at a foremost side with respect to the second cover plate 51 within an allowable range by the second elastic washer. That is, the first elastic washer 45 and the second elastic washer dispose the components of the first and second dampers 30 and 50 at the foremost side within the allowable range.

Meanwhile, the engine clutch 80 may be pressed forward by the piston plate, and the driven hub 59 connected to the engine clutch 80 may receive a forward axial force even though the spline connection is made. However, because the first damper 30 and the second damper 50 has been already moved and disposed at the foremost side by the friction washers within the allowable range by the elastic washers as described above, the axial force is never transmitted to the elastic washers. Therefore, the torsional damper installed in the hybrid drive module of the second embodiment consistently applies a designed preload to the driven plate 35 and the driven hub 59.

This means that the designed hysteresis torque does not change even under varying operating conditions. That is, according to the embodiment, the elastic washers, which provide hysteresis torque to the first damper 30 and the second damper 50, may provide intended hysteresis torque by applying elastic force to the first damper 30 and the second damper 50 in response to a designed preload regardless of whether the engine clutch 80 operates.

When the hysteresis torque is applied to both the first damper 30 and the second damper 50 connected in series as in the embodiment, it is possible to improve the effect of reducing noise of the engine. In addition, when the second hysteresis torque, which is applied to the second damper 50 disposed to be farther from the engine in the drive system, is set to be equal to or higher than the first hysteresis torque applied to the first damper 30 disposed to be closer to the engine in the drive system, the hysteresis torque, which corresponds to an amplitude of an idling output of the engine, is applied to both the two dampers connected in series in accordance with the designed intention, such that the effect of reducing noise may be more assuredly exhibited.

While the present invention has been described above with reference to the accompanying drawings, the present invention is not limited to the drawings and the embodiments disclosed in the present specification, and it is apparent that the present invention may be variously changed by those skilled in the art without departing from the technical spirit of the present invention. Further, even though the operational effects of the configurations of the present invention have not been explicitly disclosed and described in the description of the embodiment of the present invention, the effects, which can be expected by the corresponding configurations, should, of course, be acceptable.

The invention claimed is:

1. A torsional damper, which is disposed between a rotor sleeve, which is configured to receive a rotational force of an engine, and a rotor hub, which is disposed rearward of the rotor sleeve, and configured to transmit the rotational force of the engine to the rotor hub, the torsional damper comprising:
   a first damper,
   wherein the first damper comprises:
      a first damper spring configured to absorb vibration of the rotational force of the engine;
      a first cover plate disposed between the first damper spring and the rotor sleeve and connected to the rotor sleeve; and
      a driven plate disposed between the first damper spring and the rotor hub and connected to the rotor hub,
   wherein the driven plate comprises a first stopper accommodation portion configured to penetrate a thickness of the driven plate,
   wherein the first cover plate comprises a first stopper accommodated in the first stopper accommodation portion, and
   wherein the first damper further comprises shield members configured to cover an opening of the first stopper accommodation portion to restrict a movement of a fluid in a radial direction through the first stopper accommodation portion.

2. The torsional damper of claim 1, wherein the driven plate further comprises:
a driven body portion having an inclined section extending radially outward in a shape inclined with respect to an axial direction; and
a first neck portion connected to a radially outer side of the driven body portion and configured to interfere with the first damper spring in a circumferential direction,
wherein the first stopper accommodation portion is provided in the inclined section,
wherein the first cover plate further comprises a first cover body portion disposed radially inward of the first damper spring and disposed radially outward of the inclined section,
wherein the first stopper extends radially inward from the first cover body portion, and
wherein a circumferential width of the first stopper accommodation portion is larger than a circumferential width of the first stopper to restrict a rotational displacement of the first cover plate relative to the driven plate to a predetermined range.

3. The torsional damper of claim 2, wherein the shield member comprises an oil dam extending radially inward from the first cover body portion in a shape corresponding to a shape in which the inclined section of the driven body portion is inclined with respect to the axial direction, and
wherein the oil dam covers the first stopper accommodation portion at a radially outer side of the first stopper accommodation portion without being accommodated in the first stopper accommodation portion.

4. The torsional damper of claim 3, wherein the oil dam and the first stopper are alternately disposed in the circumferential direction.

5. The torsional damper of claim 2, wherein the shield member comprises a baffle plate stacked on a radial inner surface of the inclined section of the driven body portion and configured to cover the first stopper accommodation portion at a radially inner side of the first stopper accommodation portion.

6. The torsional damper of claim 5, wherein the baffle plate comprises:
a baffle body portion corresponding to the inclined section and configured to cover the first stopper accommodation portion; and
a third binding portion extending toward a radially inner side of the baffle body portion and fixed to the driven plate.

7. The torsional damper of claim 6, further comprising:
a second damper connected in series to the first damper,
wherein the second damper comprises a second cover plate connected to the driven plate of the first damper and configured to receive a rotational force of the first damper,
wherein a first binding portion is provided radially inside the driven plate,
wherein a second binding portion bound to the first binding portion is provided radially inside the second cover plate, and
wherein the first binding portion, the second binding portion, and the third binding portion are fixed together by common fixing means.

8. The torsional damper of claim 1, wherein the first stopper accommodation portion comprises:
a first opening directed in a direction in which the first stopper is accommodated; and
a second opening opposite to the first opening, and
wherein the shield member covers the first opening.

9. The torsional damper of claim 1, wherein the first stopper accommodation portion comprises:
a first opening directed in a direction in which the first stopper is accommodated; and
a second opening opposite to the first opening, and
wherein the shield member covers the second opening.

10. The torsional damper of claim 1, further comprising:
a second damper connected in series to the first damper at a rear side of the first damper,
wherein the second damper is connected to the driven plate, and
wherein a first fluid passageway is formed on the driven plate and connects a front space and a rear space of the driven plate so that the front space and the rear space of the driven plate communicate with each other.

11. The torsional damper of claim 10, wherein the second damper has a second cover plate connected to the driven plate, and
wherein a second fluid passageway is formed on the second cover plate and connected to the first fluid passageway.

12. The torsional damper of claim 11, wherein a third fluid passageway is formed on the shield member and connected to the first fluid passageway.

13. The torsional damper of claim 1, wherein the torsional damper is connected to the rotor hub through an engine clutch,
wherein the engine clutch is pressed by a piston plate configured to press the engine clutch in a direction from the rotor hub toward the rotor sleeve in the axial direction,
wherein the first damper further comprises a first hysteresis device configured to provide first hysteresis torque between the first cover plate and the driven plate, and
wherein the first hysteresis device comprises:
a first rear friction washer disposed between the driven body portion and the first cover body portion;
a second front friction washer disposed opposite to a region, in which the first rear friction washer is disposed, with the driven body portion interposed therebetween; and
a first elastic washer disposed between the first driven body portion and the first rear friction washer.

14. The torsional damper of to claim 1, further comprising:
a second damper connected in series to the first damper between the first damper and the rotor hub.

15. The torsional damper of to claim 1, wherein the first cover plate is disposed radially outward of the first damper spring and connected to the rotor sleeve.

16. The torsional damper of claim 1, wherein the rotor sleeve comprises:
a radial extension portion extending in the radial direction; and
an axial extension portion extending in the axial direction from an end of the radial extension portion, and
wherein the first damper spring is supported in the axial direction by the radial extension portion of the rotor sleeve, supported radially outward by the axial extension portion of the rotor sleeve, and supported in the circumferential direction by a first circumferential support portion provided on the rotor sleeve.

17. The torsional damper of claim 1, wherein the torsional damper is connected to the rotor hub through an engine clutch, and the torsional damper and the engine clutch are spline-connected so that a rotation of the torsional damper and a rotation of the engine clutch are restricted in a rotation direction, and the torsional damper and the engine clutch are allowed to relatively slide in the axial direction.

18. A hybrid drive module comprising:
a rotor sleeve configured to receive a rotational force of an engine;
a rotor hub disposed rearward of the rotor sleeve; and
a torsional damper disposed between the rotor sleeve and the rotor hub and configured to transmit the rotational force of the engine to the rotor hub,
wherein the torsional damper includes a first damper,
wherein the first damper comprises:
a first damper spring configured to absorb vibration of the rotational force of the engine;
a first cover plate disposed between the first damper spring and the rotor sleeve and connected to the rotor sleeve; and
a driven plate disposed between the first damper spring and the rotor hub and connected to the rotor hub,
wherein the driven plate comprises a first stopper accommodation portion configured to penetrate a thickness of the driven plate,
wherein the first cover plate comprises a first stopper accommodated in the first stopper accommodation portion, and
wherein the first damper further comprises shield members and configured to cover an opening of the first stopper accommodation portion to restrict a movement of a fluid in a radial direction through the first stopper accommodation portion.

19. The hybrid drive module of claim 18, wherein the torsional damper is a wet damper configured to be cooled by oil.

20. The hybrid drive module of claim 19, wherein a space between the rotor sleeve and the rotor hub is filled with the oil, and the oil supplied to the space flows from the inside to the outside in the radial direction.

* * * * *